US 7,655,083 B2

(12) United States Patent
Szajewski et al.

(10) Patent No.: US 7,655,083 B2
(45) Date of Patent: Feb. 2, 2010

(54) PRINTING INK JET IMAGE WITH INK OF CATIONIC COLORANT AND COLORLESS INK OF ANIONIC POLYMER

(75) Inventors: Richard P. Szajewski, Rochester, NY (US); Xiaoru Wang, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 12/372,791

(22) Filed: Feb. 18, 2009

(65) Prior Publication Data

US 2009/0155465 A1 Jun. 18, 2009

Related U.S. Application Data

(62) Division of application No. 11/094,150, filed on Mar. 30, 2005, now Pat. No. 7,537,650.

(51) Int. Cl.
B05D 1/06 (2006.01)
C08K 3/20 (2006.01)
C08L 33/02 (2006.01)
C08L 75/04 (2006.01)

(52) U.S. Cl. ............ 106/31.25; 106/31.6; 106/31.9; 427/469; 524/500; 524/503; 524/504; 524/505; 524/506; 524/507; 524/508; 524/513; 524/514; 524/522; 524/525; 524/527; 524/528; 524/537; 524/538; 524/439; 524/540; 524/542

(58) Field of Classification Search ............... None
See application file for complete search history.

(56) References Cited

U.S. PATENT DOCUMENTS

| | | | |
|---|---|---|---|
| 5,428,383 A | 6/1995 | Shields et al. | |
| 5,488,402 A | 1/1996 | Shields et al. | |
| 5,518,534 A | 5/1996 | Pearlstine et al. | |
| 5,554,739 A | 9/1996 | Belmont | |
| 5,679,138 A | 10/1997 | Bishop et al. | |
| 5,679,143 A | 10/1997 | Looman | |
| 5,707,432 A | 1/1998 | Adams et al. | |
| 5,772,742 A | 6/1998 | Wang | |
| 5,803,959 A | 9/1998 | Johnson et al. | |
| 5,922,118 A | 7/1999 | Johnson et al. | |
| 6,039,793 A | 3/2000 | Gundlach et al. | |
| 6,399,674 B1 | 6/2002 | Kashiwazaki et al. | |
| 6,533,407 B2 | 3/2003 | Mouri et al. | |
| 6,809,128 B2 | 10/2004 | Ohta et al. | |
| 6,814,793 B2 | 11/2004 | Akers et al. | |
| 7,015,259 B2 | 3/2006 | Kataoka et al. | |
| 2002/0059883 A1 | 5/2002 | Takada et al. | |
| 2002/0077385 A1 | 6/2002 | Miyabayashi | |
| 2004/0118320 A1 | 6/2004 | Akers et al. | |
| 2006/0132565 A1 | 6/2006 | Szajewski et al. | |

FOREIGN PATENT DOCUMENTS

| | | |
|---|---|---|
| EP | 1072429 | 1/2001 |
| EP | 1090966 B1 | 3/2005 |
| WO | WO 96/18689 | 6/1996 |
| WO | WO 96/18695 | 6/1996 |
| WO | WO 96/18696 | 6/1996 |
| WO | WO 99/51690 | 10/1999 |
| WO | WO 00/05313 | 2/2000 |
| WO | WO 01/51566 A1 | 7/2001 |

OTHER PUBLICATIONS

"Polymeric Surface Modification of Pigmented Colorants and Applications to Digital Printing" by Mark Kowalski et al., NIP17:International Conference on Digital Printing Technologies, 2001.

"Surface Modification of Carbon Black: Next Generation Inkjet Pigments" by Paul Palumbo, Cabot Boston Chapter IS&T, May 2001.

*Primary Examiner*—Robert Sellers
(74) *Attorney, Agent, or Firm*—Sarah Meeks Roberts; Arthur E. Kluegel; Andrew J. Anderson

(57) ABSTRACT

This invention relates to method of printing an ink jet image using an ink jet ink set comprising a colored aqueous ink and a substantially colorless aqueous ink, wherein the colored ink comprises a cationic coloring agent and the colorless ink comprises an anionic polymer or oligomer.

17 Claims, No Drawings

PRINTING INK JET IMAGE WITH INK OF CATIONIC COLORANT AND COLORLESS INK OF ANIONIC POLYMER

CROSS-REFERENCE TO RELATED APPLICATIONS

This is a divisional of application Ser. No. 11/094,150, filed Mar. 30, 2005 U.S. Pat. No. 7,537,650.

FIELD OF THE INVENTION

This invention relates to a method of ink jet printing and particularly to the imagewise admixture of inks having cationic colorants and inks having anionic polymeric agents thereby enabling the formation of high and consistent density independent of the media employed.

BACKGROUND OF THE INVENTION

Ink jet printing is a non-impact method for producing images by the deposition of ink droplets in a pixel-by-pixel manner to an image-recording element in response to digital signals. There are various methods that may be utilized to control the deposition of ink droplets on the image-recording element to yield the desired image. In one process, known as continuous inkjet, a continuous stream of droplets is charged and deflected in an imagewise manner onto the surface of the image-recording element, while unused droplets are caught and returned to an ink sump. In another process, known as drop-on-demand ink jet, individual ink droplets are projected as needed onto the image-recording element to form the desired image. Common methods of controlling the projection of ink droplets in drop-on-demand printing include piezoelectric transducers and thermal bubble formation. Ink jet printers have found broad applications across markets ranging from industrial labeling to short run printing to desktop document and pictorial imaging.

The inks used in the various inkjet printers can be classified as either dye-based or pigment-based. A dye is a colorant, which is dissolved in the carrier medium. A pigment is a colorant that is insoluble in the carrier medium, but is dispersed or suspended in the form of small particles, often stabilized against flocculation and settling by the use of dispersing agents. The carrier medium can be a liquid or a solid at room temperature in both cases. Commonly used carrier media include water, mixtures of water and organic co-solvents and high boiling organic solvents, such as hydrocarbons, esters, ketones, etc.

Bishop and Czekai in U.S. Pat. No. 5,679,138 describe the preparation and use of micro-milled pigments and carbons employing anionic dispersing agents. These micro-milled pigments are particularly useful in ink-jet printing because of their small particle size. Only anionic charge stabilized pigments are described. More recently, the preparation of covalently functionalized (self-dispersed) pigments and carbons suitable for ink jet printing have been described, inter alia, by Belmont in U.S. Pat. No. 5,554,739, Adams and Belmont in U.S. Pat. No. 5,707,432, Johnson and Belmont in U.S. Pat. Nos. 5,803,959 and 5,922,118 and in published applications WO 96/18695, WO 96/18696, WO 96/18689, WO 99/51690, WO 00/05313, and WO 01/51566. These publications further describe the preparation and use of ink-jet inks employing the described self-dispersed pigments. Both anionic and cationic self-dispersed pigments are described. Takada et al in U.S. Pub App 2002/0059883 described the advantages of further stabilizing cationic self-dispersed pigments with acid components. Miyabayashi, in U.S. published application 2002/0077385 describes employing distinct colored inks, each ink employing differently colored anionic polymer stabilized coloring materials or cationic polymer stabilized coloring materials in distinct ink-jet printing channels to control inter-color bleed. Katsuragi et al., in EP 1090966 and Kashiwazaki et al., in U.S. Pat. No. 6,399,674 describe employing distinct colored inks, each ink employing differently colored anionic polymer stabilized coloring materials, anionic dyes or cationic polymer stabilized coloring materials or cationic dyes in distinct ink-jet printing channels to control inter-color bleed. Earlier, Pearlstine et al. in U.S. Pat. No. 5,518,534, Looman in U.S. Pat. No. 5,679,143, Shields and Radke in U.S. Pat. No. 5,428,383 and U.S. Pat. No. 5,488,402, Wang in U.S. Pat. No. 5,772,742 and Gundlach et al., in U.S. Pat. No. 6,039,793 described approaches to control color bleed between image regions having distinct colored inks applied. Such approaches included pH adjustment or addition of multivalent metallic ions to individual colored inkjet inks. While these approaches appear to improve the inter-color bleed problem, the formation of high, uniform and consistent single color densities on a variety of plain papers as well as designed ink-jet papers have not been adequately addressed.

SUMMARY OF THE INVENTION

This invention provides an ink jet ink set comprising a colored aqueous ink and a substantially colorless aqueous ink, wherein the colored ink comprises a cationic coloring agent and the colorless ink comprises an anionic polymer or oligomer.

This invention further provides a method of printing an ink jet image comprising separately applying to an ink jet receiver a colored ink and a substantially colorless ink, wherein the colored ink comprises a cationic coloring agent and the colorless ink comprises an anionic polymer or oligomer, and wherein the inks are applied in substantially an overlaying manner.

Use of the described combinations enables the formation of high, uniform and consistent single color densities across a variety of plain papers.

DETAILED DESCRIPTION OF THE INVENTION

While the invention is in no way limited by the following theory, the inventors believe the mixing of both cationic and anionic charged material during application to the media enables consistent single color density on a variety of papers, particularly plain papers. Modern plain papers tend to be anionic in characteristic while historic plain papers and designed ink-jet media tend to be cationic in character. Accordingly, anionic charged ink components will adhere well to historic plain papers and designed ink-jet media while cationic charged ink components will adhere well to modern plain papers. Mixtures of both anionic and cationic charged ink components will adhere to one another on mixture, forming mixed complexes and at least one of the two inks will adhere well to both plain paper and designed ink-jet media thus binding the formed complexes to the media.

In general, the colored ink jet ink composition consists of an aqueous vehicle which functions as a carrier, and a coloring agent. Additives and/or co-solvents can be incorporated in order to adjust the ink to attain the desired performance, and will be described in detail later herein.

The term 'coloring agent' as used herein may refer to just a colorant, or it may refer to a colorant in combination with, example, a dispersant of some kind. The colorants used herein are dyes or pigments, more preferably pigments. The colorant may be any color, but preferably the colorant is cyan, magenta, yellow or black. The coloring agent generally comprises a colorant which may be self-dispersed, polymer-dispersed or surfactant dispersed. When the colorant is self-dispersed the colorant is synonymous with the coloring agent.

Self-dispersed pigment refers to pigments that have been chemically modified with a charge or a polymeric group, wherein the chemical modification aids the pigment in becoming and/or substantially remaining dispersed in a liquid vehicle. When the pigment is a self-dispersing pigment the charging moiety is covalently linked to the pigment. As used herein, polymer-dispersed pigment refers to pigments that utilize a polymer or an oligimer dispersant and/or pigments that utilize a polymer or oligimer physical coating to aid the pigment in becoming and/or substantially remaining dispersed in a liquid vehicle. When the coloring agent is a polymer-dispersed pigment, the polymer may provide the cationic charge. Surfactant-dispersed pigment refers to pigments that utilize a surfactant dispersant to aid the pigment in becoming and/or substantially remaining dispersed in a liquid vehicle. When the coloring agent is a surfactant-dispersed pigment, the surfactant may provide the cationic charge. It is also possible that both the pigment and the surfactant or polymer are charged, or that the pigment is charged and the polymer or surfactant are not. What is necessary is that the "charge" remain "available" for interaction with other components on mixing i.e. that the charge is not masked. Normally for a polymer- or surfactant-dispersed pigment, the charge would be provided by the polymer or the surfactant.

The colorant may be chosen from a wide range of conventional colored colorants, preferably pigments. Preferably, the pigment is a white pigment, a black pigment, a blue pigment, a brown pigment, a cyan pigment, a green pigment, a violet pigment, a magenta pigment, a red pigment, or a yellow pigment, or shades or combinations thereof. Suitable classes of colored pigments include, for example, anthraquinones, phthalocyanine blues, phthalocyanine greens, diazos, monoazos, pyranthrones, perylenes, heterocyclic yellows, quinacridones, diketopyrolo-pyroles, and (thio)indigoids. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyanthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Violet, Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 110, Pigment Yellow 117, Pigment Yellow 128, Pigment Yellow 138, Pigment Yellow 151 and Pigment Yellow 155. A representative example of diketopyrolo-pyroles include Pigment Red 254. Such pigments are commercially available in either powder or press cake form from a number of sources including, BASF Corporation, Engelbard Corporation and Sun Chemical Corporation. Examples of other suitable colored pigments are described in the Colour Index, 3rd edition (The Society of Dyers and Colourists, 1982). Representative examples of black pigments include various carbon blacks (Pigment Black 7) such as channel blacks, furnace blacks and lamp blacks, and include, for example, carbon blacks sold under the Regal®, Black Pearls®, Elftex®, Monarch®, Mogul®, and Vulcan® trademarks available from Cabot Corporation (such as Black Pearls® 2000, Black Pearls® 1400, Black Pearls®1300, Black Pearls® 1100, Black Pearls® 1000, Black Pearls® 900, Black Pearls® 880, Black Pearls® 800, Black Pearls® 700, Black Pearls®L, Elftex® 8, Monarch® 1400, Monarch® 1300, Monarch®1100, Monarch® 1000, Monarch® 900, Monarch®880, Monarch® 800, Monarch® 700, Mogul®L, Regal® 330, Regal® 400, Vulcan®P). Other suitable carbon blacks include, but are not limited to, Printex 40, Printex 80, Printex 300, Printex L, Printex U, Printex V, Special Black 4, Special Black 5, FW200, (the foregoing available from Degussa Corporation), Raven 780, Raven 890, Raven 1020, Raven 1040, Raven 1255, Raven 1500, Raven 5000, Raven 5250 (the foregoing available from Columbian Chemical Corporation) and MA100 and MA440 available from Mitsubishi Chemical Corporation.

Other suitable pigments within the scope of the present invention include carbon products such as graphite, carbon black, vitreous carbon, carbon fibers, activated charcoal, and activated carbon. The carbon may be of the crystalline or amorphous type. Finely divided forms of the above are preferred; also, it is possible to utilize mixtures of different carbons.

Preferred pigments include those that comprise at least one metal that is not a divalent metal. Examples include, but are not limited to, phthalocyanine pigments containing aluminum, zinc, magnesium, or iron.

The pigments will typically have a wide range of BET surface areas, as measured by nitrogen adsorption. Preferably, the pigment has a surface area equal to or greater than 10 $m^2/g$, and more preferably equal to or greater than and 100 $m^2/g$, thereby corresponding to a smaller primary/aggregate particle size. Such surface areas have been found to provide for a more uniform distribution and efficient level of treating agent on the pigment and a higher percent yield of the modified pigment after post processing techniques. If the preferred higher surface area of the pigment (thereby corresponding to a smaller particle size) is not readily available, it is well recognized by those skilled in the art that the pigment may be subjected to conventional size comminution or reduction techniques, such as ball or jet milling, to reduce the pigment to the desired particle size.

The ink compositions employing self-dispersed pigments used in the present invention include at least one modified pigment having attached at least one organic group. The organic group may vary depending on the vehicle used for the ink composition as well as on the desired ink and print performance properties. This allows for greater flexibility by tailoring the pigment to the specific application.

In one embodiment, the organic group comprises an ionic group, an ionizable group, or a mixture of an ionic group and an ionizable group. An ionic group is cationic and is associated with a counterion of the opposite charge including inorganic or organic counterions such as acetate, $NO_3^-$, $SO_4^{-2}$, $R'SO_3^-$, $R'OSO_3^-$, $OH^-$, and $Cl^-$ where R' represents hydrogen or an organic group such as a substituted or unsubstituted aryl and/or alkyl group. An ionizable group is one that is capable of forming an ionic group in the medium of use. Thus, in a preferred embodiment, the organic group is an organic ionic group. Organic ionic groups include those described in U.S. Pat. No. 5,698,016, the description of which is fully incorporated herein by reference.

Positively charged organic ionic groups may be generated from protonated amines that are attached to the pigment. Preferably, an organic group having an amine substituent has a pKb of less than 5. Positively charged organic ionic group may be quaternary ammonium groups ($-NR'_3{}^+$) and quaternary phosphonium groups ($-PR'_3{}^+$), where R' represents hydrogen or an organic group such as a substituted or unsubstituted aryl and/or alkyl group. For example, amines may be protonated to form ammonium groups in acidic media. Quaternized cyclic ammonium ions, and quaternized aromatic ammonium ions, can also be used as the organic ionic group. Thus, N-substituted pyridinium species, such as N-methylpyridyl, can be used in this regard. Examples of cationic organic groups include, but are not limited to, $-3-C_5H_4N(C_2H_5)^+$, $-3-C_5H_4N(CH_3)^+$, $-3-C_5H_4N(CH_2C_6H_5)^+$, $-C_6H_4(NC_5H_5{}^+)$, $-C_6H_4COCH_2N(CH_3)_3{}^+$, $-C_6H_4COCH_2(NC_5H_5)^+$, $-C_6H_4SO_2NH(C_4H_3N_2H^+)$, $-C_6H_4NH_3{}^+$, $-C_6H_4NH_2(CH_3)^+$, $-C_6H_4NH(CH_3)_2{}^+$, $-C_6H_4N(CH_3)_3{}^+$, $-C_6H_4CH_2NH_3{}^+$, $-C_6H_4CH_2NH_2(CH_3)^+$, $-C_6H_4CH_2NH(CH_3)_2{}^+$, $-C_6H_4CH_2N(CH_3)_3{}^+$, $-C_6H_4CH_2CH_2NH_3{}^+$, $-C_6H_4CH_2CH_2NH(CH_3)_2{}^+$, $-C_6H_4CH_2CH_2NH(CH_3)_2{}^+$ and $-C_6H_4CH_2CH_2N(CH_3)_3{}^+$. Other substituted or unsubstituted arylene or heteroarylene groups can be used in the place of the $C_6H_4$ groups shown in the structures above. Preferably, the cationic organic group is $-NR'_3{}^+$ wherein R' is an alkyl group or an aryl group. Another preferred group is $-C_5H_4N-R'^+$, wherein R' is an alkyl group such as a methyl group or a benzyl group.

In another embodiment, the organic group attached to the modified pigments used in the method of the present invention may also be polymeric. The attached polymer groups may be present as individual attached chains or as a coating on the pigment, as is described below.

For example, the organic group attached to the modified pigments may comprise a pigment having attached at least one organic group represented by the formula —X-Sp-[Polymer]R, wherein X, which is directly attached to the pigment, represents an aryl or heteroaryl group or an alkyl group and is substituted with an Sp group, Sp represents a spacer group, the group Polymer represents a polymeric group comprising repeating monomer groups or multiple monomer groups or both, and R represents hydrogen, a bond, a substituted or unsubstituted alkyl group, or a substituted or unsubstituted aryl group. The group Polymer can be substituted or unsubstituted with additional groups. The total number of monomer repeating units that comprise the "polymer" is not greater than about 500 monomer repeating units.

The group Polymer can be any polymeric group capable of being attached to a pigment. Thus, for example, the group Polymer can be a thermoplastic polymeric group or a thermosetting polymeric group. Further, the polymeric group can be a homopolymer or copolymer. Further, the group Polymer can be any type of polymeric group, such as a random polymer, alternating polymer, graft polymer, block polymer, star-like polymer, and/or comb-like polymer. The group Polymer can also be one or more polyblends. The group Polymer can be an interpenetrating polymer network (IPN); simultaneous interpenetrating polymer network (SIN); or interpenetrating elastomeric network (IEN).

For the group Polymer, examples include, but are not limited to, linear-high polymers such as polyethylene, poly(vinylchloride), polyisobutylene, polystyrene, polycaprolactam (nylon), polyisoprene, and the like. Other general classes are polyamides, polycarbonates, polyelectrolytes, polyesters, polyethers, (polyhydroxy)benzenes, polyimides, polymers containing sulfur (such as polysulfides, (polyphenylene) sulfide, and polysulfones), polyolefins, polymethylbenzenes, polystyrene and styrene copolymers (ABS included), acetal polymers, acrylic polymers, acrylonitrile polymers and copolymers, polyolefins containing halogen (such as polyvinyl chloride and polyvinylidene chloride), fluoropolymers, ionomeric polymers, polymers containing ketone group(s), liquid crystal polymers, polyamide-imides, polymers containing olefinic double bond(s) (such as polybutadiene and polydicyclopentadiene), polyolefin copolymers, polyphenylene oxides, poly(vinyl alcohols), polyurethanes, thermoplastic elastomers, and the like. Preferably at least some of these monomer units of the group Polymer comprise an ionic group, an ionizable group, or a mixture of ionic or ionizable groups. Additional examples thereof may include those obtained by polymerization of a vinyl monomer and having a cationic nature in at least a part of the resulting polymer. Examples of a cationic monomer for forming the cationic moiety include salts of such tertiary amine monomers as described below, and quaternized product thereof. Namely, there are mentioned: N,N-dimethylaminoethyl methacrylate, N,N-dimethyl-aminoethyl acrylate, N,N-dimethyl aminopropyl methacrylate, N,N-dimethylaminopropyl acrylate, N,N-dimethylacrylamide, N,N-dimethylmethacrylamide, N,N-dimethylaminoethylacrylamide, N,N-dimethylaminoethylmethacrylamide, N,N-dimethylaminopropylacrylamide, and N,N-dimethylaminopropyl-methacrylamide. In the case of a tertiary amine, examples of a compound for forming a salt include hydrochloric acid, sulfuric acid and acetic acid. Examples of a compound used in quaternization include methyl chloride, dimethylsulfuric acid, benzyl chloride and epichlorohydrin. Among these, methyl chloride and dimethylsulfuric acid are preferred for preparing a dispersing agent used in the present invention. Such tertiary amine salts or quaternary ammonium compounds as described above behave as a cation in water, and under neutralized conditions, they are stably soluble in an acidic region. The content of these monomers in the copolymer is preferably within a range of from 20 to 60% by weight. Examples of other monomers used in the formation of the above-described high-molecular dispersing agents include hydrophobic monomers, for example, acrylic esters having a hydroxyl group, such as 2-hydroxyethyl methacrylate; and acrylic esters having a side chain of long ethylene oxide chain; and styrene monomers, and water-soluble monomers soluble in water at a pH of about 3 to 10, such as acrylamides, vinyl ethers, vinylpyrrolidones, vinylpyridines and vinyloxazolidines. As the hydrophobic monomers, styrene, styrene derivatives, vinylnaphthalene, vinylnaphthalene derivatives, (meth)acrylic acid alkyl esters and acrylonitrile can be used. In the high-molecular dispersing agent obtained by the copolymerization, the water-soluble monomer be used in the range of from 15 to 35% by weight for the stability of the copolymer in an aqueous solution, and the hydrophobic monomer be used in the range of from 20 to 40% by weight for enhancing the dispersing effect of the copolymer to the pigment.

The group Sp represents a spacer group as described above. Spacer group, as used herein, is a link between two groups and can be a bond, or a chemical group such as, but not limited to, esters such as $-CO_2-$ and $-O_2C-$, sulfones such as $-SO_2-$ and $-SO_2C_2H_4-$, ketones such as $-C(O)-$, amide derivatives such as $-NRC(O)-$, $-C(O)NR-$, $-NRCO_2-$, $-O_2CNR-$, and $-NRC(O)NR-$, sulfonates, sulfonamides, $-O-$, $-S-$, amines such as $-NR$, imides, arylene groups, alkylene groups, and the like, wherein R, which can be the same or different, represents hydrogen or an organic group such as a substituted or unsubstituted aryl and/or alkyl group.

The group X represents an aryl or heteroaryl group or an alkyl group. X is directly attached to the pigment and is further substituted with an Sp group. The aromatic group can be further substituted with any group, such as one or more alkyl groups or aryl groups. Preferably, the aryl or heteroaryl group is phenyl, naphthyl, anthracenyl, phenanthrenyl, or biphenyl, and the heteroaryl group is pyridinyl, benzothiadiazolyl, or benzothiazolyl. When X represents an alkyl group, examples include, but are not limited to, substituted or unsubstituted alkyl groups which may be branched or unbranched. The alkyl group can be substituted with one or more groups, such as aromatic groups. Preferred examples include, but are not limited to, $C_1$-$C_{12}$ groups like methyl, ethyl, propyl, butyl, pentyl, or hexyl groups. Preferably, X is an aryl group.

The group X may be substituted with one or more functional groups. Examples of functional groups include, but are not limited to, $R'''$, $OR'''$, $COR'''$, $COOR'''$, $OCOR'''$, carboxylates, halogens, CN, $NR'''_2$, $SO_3H$, sulfonates, sulfates, $NR'''(COR''')$, $CONR'''_2$, $NO_2$, $PO_3H_2$, phosphonates, phosphates, $N=NR'''$, $SOR'''$, $NSO_2R'''$, wherein $R'''$ which can be the same or different, is independently hydrogen, branched or unbranched $C_1$-$C_{20}$ substituted or unsubstituted, saturated or unsaturated hydrocarbons, e.g., alkyl, alkenyl, alkynyl, substituted or unsubstituted aryl, substituted or unsubstituted heteroaryl, substituted or unsubstituted alkaryl, or substituted or unsubstituted aralkyl.

As shown by the structures above, the group Polymer is attached to the pigment through the spacer group Sp. However, it will also be recognized that when R represents a bond, the available bond can also be attached to the pigment. In addition, the group Polymer can also be attached to the pigment at multiple points along the polymer chain through proper choice of substituent groups on the repeating monomer units. These substituents may also comprise spacer groups or —X-Sp-groups as described above. Thus, these groups can be attached to the pigment at either end or at points along the backbone. Further, these groups can be any type of polymeric group, such as a random polymer, alternating polymer, graft polymer, block polymer, star-like polymer, and/or comb-like polymer.

As another example, the polymer group attached to the pigment can also be directly attached. Thus, the polymer can be attached either through a covalent or ionic bond. The amount of polymer present on the modified pigments can be high enough to cover a substantial amount of the pigment. Thus, in another embodiment, the modified pigment products used in the method of the present invention comprise a pigment that is at least partially coated with one or more polymeric coatings and can be substantially or fully coated by one or more polymers. The use of the term "coated" includes both partially and fully coated pigments and modified pigments—the polymer partially or fully encapsulates the modified pigment, wherein the modified pigment is the core and the polymer is the shell. The polymer(s) coated onto or used to encapsulate the modified pigment is preferably present on the modified pigment such that the polymer(s) is not substantially extractable by an organic solvent. More preferably, the polymer(s) on the modified pigment is attached by physical (for example, adsorption) and/or chemical means (for example, bonding or grafting).

Further details concerning the polymer coated pigments and methods of making them are set forth in International Published Application No. WO 00/22051, incorporated in its entirety by reference herein.

In another preferred embodiment, the attached organic group is a dye. These attached dye organic groups are similar to those that are traditionally used as colorants in ink compositions. Attached dyes include, but are not limited to, food dyes, FD&C dyes, derivatives of phthalocyanine tetrasulfonic acids, including copper phthalocyanine derivates, tetra sodium salts, tetra ammonium salts, tetra potassium salts, tetra lithium salts, and the like. Attached dyes can, for example, provide the ability to modify color balance and adjust optical density while at the same time maintaining and/or providing pigment stability.

The amount of attached organic groups, whether ionic, ionizable, or polymeric, employed with charged pigments useful in the present invention can be varied in order to attain desired performance attributes, such as dispersibility in the ink vehicle and print water-fastness and smear-fastness. In addition, modified pigment products comprising multiple attached organic groups can result in improved properties. In general, the amount of attached organic groups is from about 0.01 to about 10.0 micromoles of organic group per $m^2$ surface area of pigment, as measured by nitrogen adsorption (BET method). For example, the amount of attached organic groups is between from about 0.5 to about 4.0 micromoles per $m^2$.

The modified pigments used in the method of the present invention are modified using methods known to those skilled in the art such that organic groups are attached to the pigment. This provides a more stable attachment of the groups onto the pigment compared to adsorbed groups, such as polymers, surfactants, and the like. For example, the modified pigments used in the method of the present invention can be prepared using the methods described in U.S. Pat. Nos. 5,554,739; 5,851,280; 6,042,643; 5,707,432; and 5,837,045, and PCT Publication WO 99/23174, the descriptions of which are fully incorporated herein by reference.

The modified pigments can be purified by washing, such as by filtration, centrifugation, or a combination of the two methods, to remove unreacted raw materials, byproduct salts and other reaction impurities. The products may also be isolated, for example, by evaporation or it may be recovered by filtration and drying using known techniques to those skilled in the art. Dispersions of the pigments may be further purified or classified to remove impurities and other undesirable free species that can co-exist in the dispersion as a result of the manufacturing process. For example, the dispersion can be purified to remove any undesired free species, such as unreacted treating agent. Known techniques of ultrafiltration/diafiltration using a membrane or ion exchange may be used to purify the dispersion and remove a substantial amount of free ionic and unwanted species. An optional exchange of counterions step may also occur in the purification process whereby the counterions that form a part of the modified pigment are exchanged or substituted with alternative counterions (including, e.g., amphiphilic ions) utilizing known ion exchange techniques such as ultrafiltration, reverse osmosis, ion exchange columns and the like. Particular examples of counterions that can be exchanged include, but are not limited to $Cl^-$, $NO_3^-$, $NO_2^-$, acetate and $Br^-$.

The ink compositions can be formed with a minimum of additional components (additives and/or cosolvents) and processing steps. The modified pigment is present in the ink compositions in an amount effective to provide the desired image qualities (for example, optical density) without detrimentally affecting the performance of the ink. For example, typically, the modified pigment will be present in an amount ranging from about 1% to about 20% based on the weight of the ink. It is also within the bounds of the present invention to use a formulation containing a mixture of unmodified pigments with the modified pigments described above.

The ink compositions can be further purified and/or classified using methods such as those described above for the modified pigments and dispersions thereof. An optional counterion exchange step can also be used. In this way, unwanted impurities or undesirable large particles can be removed to produce ink with good overall properties.

Polymeric and oligimeric dispersed pigments useful in the present invention can employ the same or similar charged polymeric materials as described above. Here the charged polymers or oligimer are employed as a dispersing agent for pigment. Any water-soluble resin may be used so far as it can disperse a pigment stably in water or an aqueous medium by the action of a cationic group. However, those having a weight average molecular weight ranging from 1,000 to 30,000, more preferably from 3,000 to 15,000 are particularly preferred. Specific examples of such water-soluble resins include block copolymers, graft copolymers and random copolymers composed of at least two monomers selected from hydrophobic monomers such as styrene, styrene derivatives, vinylnaphthalene, vinylnaphthalene derivatives and aliphatic alcohol esters of alpha, beta.-ethylenically unsaturated amines and hydrophilic monomers such as ammonium and phosphonium salts and derivatives thereof, and salts of these copolymers. These resins are acid soluble resins that dissolve in an aqueous solution of an acid.

Besides, homo-polymers composed of a hydrophilic monomer, water soluble polymers or salts thereof may also be used. These water-soluble resins are preferably used within a range of from 0.1 to 5% by weight based on the total weight of the ink.

The pigment inks used in the present invention are prepared by dispersing or dissolving such pigment and water-soluble resin as described above in an aqueous medium. The aqueous medium preferably used in the pigment inks is a mixed solvent of water and a water-soluble organic solvent. As the water, it is preferable to use ion-exchanged water (deionized water) instead of tap water containing various ions.

Surfactant dispersed pigments employ low molecular weight surface-active agents as dispersants. Any cationically charged low molecular weight surface active agent known in the art can be employed to disperse pigments in a manner useful in the practice of the invention. Examples of cationic surfactants useful in this regard include but are not limited to mono-, di-, tri- and tetraalkyl ammonium salts, mono-, di-, tri- and tetraryl ammonium salts, mixed alkyl-aryl ammonium salts, the corresponding alkyl and aryl phosphonium salts, pyridinium salts, and heterocyclic ammonium salts. Also useful are lower molecular weight amins oligimers such as polyethylene imine salts, polyallyl amine salts, polyvinyl amine salts and the like. Specific examples of low molecular weight surface-active agent include but are not limited to oleoyl ammonium chloride, and cetyl trimethyl ammonium bromide and so forth. Cationic surfactants can be employed in this manner. The used amount of such a cationic charged substance as described above is preferably within a range of from 0.05 to 10% by weight, more preferably from 0.05 to 5% by weight based on the total weight of the ink.

Useful dyes having a cationic charge may include any suitable cationic dye known in the art. These include but are not limited to those described in WO 95/01772, WO 95/15144, EP 714 954, EP 318 294, in the *Color Index*. 4$^{th}$ ed. *The Society of Dyers and Colorists, London*, and in Broadbent, A. D., *Basic Principles of Textile Coloration. Chap 17; Cationic Dyes, The Society of Dyers and Colorists, London* (2001). Specifically useful dyes include Rhodamine B (RB), Crystal Violet (CV), Cationic Yellow Y-13, Cationic Golden Yellow Y-28, Vationic Brilliant Yellow Y-40, Cationic Yellow Y-51, Cationic Dark Brown X-3RL, Cationic Pink R-13, Cationic Brilliant Red R-14, Cationic Red R-46, Cationic Red Violet V-16, Cationic Turquoise Blue B-03, Cationic Blue B-41, Cationic Blue B-66 and Cationic Blacks.

Any ordinary dispersing machine may be employed as a dispersing machine to prepare the pigment ink. Examples thereof include ball mills, sand mills, etc. Of these mills, a high-speed sand mill may preferably be used, such as Super Mill, Sand Grinder, Beads Mill, Agitator Mill, Grain Mill, Dyno Mill, Pearl Mill and Coball Mill (all are trade names).

In addition, if necessary, additives, such as water-soluble organic solvents, surface active agents, pH adjusting agents, rust preventives, fungicides, antioxidants, evaporation accelerators, chelating agents, and water-soluble polymers other than the above described components, may be added into inks used in the present invention.

Any water soluble organic solvents known in the ink are can be employed in the inks useful in the present invention. Examples of the water-soluble organic solvent used herein include amides such as dimethylformamide and dimethylacetamide; ketones such as acetone; ethers such as tetrahydrofuran and dioxane; polyalkylene glycols such as polyethylene glycol and polypropylene glycol; alkylene glycols such as ethylene glycol, propylene glycol, butylene glycol, triethylene glycol, 1,2,6-hexanetriol, thiodiglycol, hexylene glycol and diethylene glycol; lower alkyl ethers of polyhydric alcohols, such as ethylene glycol methyl ether, diethylene glycol monomethyl ether and triethylene glycol monomethyl ether; monohydric alcohols such as methyl alcohol, ethyl alcohol, n-propyl alcohol, isopropyl alcohol, n-butyl alcohol, sec-butyl alcohol, tert-butyl alcohol, and lower alkyl ethers of polyhydric alcohol, such as, glycerine, ethylene glycol monomethyl (or ethyl)ether, diethylene glycol monomethyl (or ethyl) ether, etc.; glycerol, cyclic amide compounds, such as, N-methyl-2-pyrrolidone, 1,3-dimethyl-2-imidazolidinone, sulfolane, dimethyl sulfo oxide, 2-pyrolidone, epsilon caprolactam, etc.; and imido compounds, such as succinimide etc., triethanolamine, sulfolane and dimethyl sulfoxide. No particular limitation is imposed on the content of the water-soluble organic solvent. However, it is preferably within a range of from 5 to 60%, more preferably from 5 to 40% based on the total weight of the liquid composition. Moreover, when a range of 30 to 95 weight % is adopted as a content of water in ink, good solubility of a coloring material is acquired, increase in viscosity of ink is suppressed, and fixing characteristics can fully be satisfied.

Besides the above components, additives such as viscosity modifiers, pH adjustors, antiseptics, various surfactants, antioxidants, evaporation accelerators, water-soluble cationic or anionic compounds commercially available water soluble-dye or the like and binder resins may be suitably incorporated as needed. The selection of the surfactants is particularly important from the viewpoint of controlling the penetrability of the liquid composition into a recording medium.

Any known cationic or neutral surfactant can be employed. Examples of cationic surfactants include but are not limited to mono-, di-, tri- and tetraalkyl ammonium salts, mono-, di-, tri- and tetraryl ammonium salts, mixed alkyl-aryl ammonium salts, the corresponding alkyl and aryl phosphonium salts, pyridinium salts, and heterocyclic ammonium salts. Examples of neutral nonionic surfactants include but are not limited to polyoxyethylene alkyl ethers, polyoxyethylene alkyl esters, polyoxyethylene sorbitan alkyl esters, lower alcohols, acetylenic alcohols and acetylene glycols. One or more of these surfactants may be suitable chosen for use. The amount of the surfactant used varies according to the kind of the dispersing agent used, but is desirably within a range of from 0.01 to 5% by weight based on the total weight of the ink. It is preferred that the amount of the surfactant added be determined in such a manner that the surface tension of the resulting ink is at least 20 mN/m (dyne/cm), because the occurrence of deformed printing (inaccurate ink landing) due to wetting of an orifice can be effectively prevented in an inkjet recording system used in the present invention. Preferable physical properties of the liquid composition as described above are, the surface tension in a range of from 10 to 70 mN/m (dyn/cm), preferably 20 to 60 mN/m (dyn/cm), and the viscosity in a range of from 1 to 30 centipoise (cP) and preferably from 1.5 to 5 centipoise. Inks comprising cationic charged pigments can be adjusted to a pH of between 1 and 7 and preferably between 3 and 5.

The binder resins may be used in combination within a limit not impeding the texture of the recording medium used and the storage stability and ejection stability of the liquid composition, for example, to further improve the rub-off resistance of the cationic fine particles, and may be freely selected from water-soluble polymers, emulsions, latexes, and so forth as known in the art.

The colorless ink jet ink composition of the invention comprises an aqueous medium and an anionic charged polymer or oligomer. The substantially colorless ink can be further employed as a protective ink. A substantially colorless ink includes inks which may have some tinting to improve the color balance of the final image. However, by substantially colorless it is intended that such inks do not form the image itself. Rather, they are used in combination to enhance the coloring capability of a cationic charge colorant, and optionally as a protective coating or to change or enhance the gloss of the final image.

The degree of anionic charge is quantified as the polymer acid number. Preferably the anionic polymer or oligomer in the colorless ink has a weight average molecular weight of 600 to 30,000. It is also preferred that the anionic polymer or oligomer in the colorless ink has an acid number of 50 to 200. In one embodiment the anionic polymer is polyester, polyurethane or polymers derived from styrene and/or acrylic acid derivatives. In a preferred embodiment, the colorless ink jet ink composition of the invention comprises an aqueous medium and at least two different anionic charged polymers, a first polymer and a second polymer, having a weight average acid number of 70 to 200. The composition may also comprise one or more additional polymers provided that the weight average acid number of all of the polymers is 70 to 200. The "weight average acid number" equals the weight percent of the $1^{st}$ polymer times the acid number of the 1st polymer+weight percent of the $2^{nd}$ polymer times the acid number of the $2^{nd}$ polymer, etc. The total weight percent of all polymers should equal 100 percent. Preferably at least two different polymers have a weight average acid number of 80 to 160. In a preferred embodiment the first polymer has an acid number of 60 to 100 and the second polymer has an acid number of 180 to 240.

Examples of useful polymers include polyester, polyurethane or polymers derived from styrene and/or acrylic acid derivatives. Useful polymers will be described in more detail below. Both condensation and addition polymers are useful. When at least two distinct polymers are employed, preferably the first polymer is a condensation polymer and the second polymer is an addition polymer. It is also preferred that the molecular weight of the polymer is independently within the range of 6,000 to 30,000. In one embodiment of the invention the first polymer is a condensation polymer that has an acid number of 60 to 100 and a molecular weight of greater than 10,000, and the second polymer is an addition polymer that has an acid number greater than 180 and a molecular weight of less than 18,000. It is particularly preferred that the first polymer is a polyurethane polymer and the second polymer is an acrylic polymer.

Examples of useful condensation polymers include polyesters, polycarbonates, polyamides, polyimides, polyurethanes, polyethers, and polysiloxane. When the first polymer is a polyurethane, it has an acid number of 60 to 100, and preferably from 70 to 90. When used herein, the term "acid number", also known as "acid value", is defined by the number of milligrams of potassium hydroxide required to neutralize one gram of polymer. Thus, the acid number of a given polymer is related to the percent of acid-containing monomer or monomers. The higher the acid number, the more acid functionality is present in the polymer. The inventors have found that if the acid number is too high (greater than 100), then the ink jet ink composition will not provide adequate stain protection, and if the acid number is too low (less than 60), then the jettability of the ink composition using an ink jet printhead will be compromised, especially when using a thermal drop-on-demand printhead.

The invention preferably employs a polyurethane formed from at least one monomer comprising at least two hydroxyl groups and another monomer comprising at least two isocyanate groups. The acid number of the polyurethane is provided by acid groups that are, in turn, provided by the at least one monomer comprising at least two hydroxyl groups. The acid groups are preferably carboxylic acid groups, but any type of acid groups may be used. Examples of monomers comprising at least two hydroxyl groups and at least one carboxylic acid group are 2,2-bis(hydroxymethyl) propionic acid and the hydroxyethylether of 4,4-bis(4-hydroxyphenyl) valeric acid. Other examples are described in U.S. Pat. No. 6,268,101 B1 and U.S. 2003/0184629 A1 and references cited therein.

The polyurethanes are also preferably derived from a monomer having at least two isocyanate groups; diisocyanates are typically used in the art of polyurethane chemistry, but triisocyanates may also be used. Examples of diisocyanates include isophorone diisocyanate and others described in the above references.

The polyurethanes used in the invention are optionally derived from an additional monomer comprising at least two hydroxyl groups and which is different from the monomer having at least two hydroxyl groups and at least one carboxyl group. These optional monomers are typically higher molecular weight monomers having a molecular weight of less than 3000. They are often referred to in the art as polyols and examples include those described in the above references. Examples include polyols and polyhydroxy derivatives of polycarbonates, polyethers, polyesters, polyacetals, polyacrylates, polyester amides and polythioethers. Preferably the optional monomer is a polycarbonate. More preferably, the optional monomer comprising at least two hydroxyl groups is a poly(hexamethylene carbonate) diol.

The polyurethane used in the invention has a weight average molecular weight, Mw, of greater than 10,000. If Mw is less than 10,000, then the ink jet ink composition will not provide adequate stain and scratch resistance. The maximum Mw of the polyurethane is not particularly limited, but is generally dictated by the physical property requirements of the composition and the method by which it will be applied, as discussed below. If the ink composition is used as an ink jet ink for a thermal printhead, then the maximum Mw of the polyurethane is preferably 30,000.

Preferably the present invention employs at least one addition polymer (this term includes copolymers) formed from a mixture of vinyl or unsaturated monomers. Preferably the addition polymer has an acid number 180 to 240, and more preferably of 200 to 240. Preferably the polymer also has a weight average molecular weight less than 18,000, and preferably in the range of 6,000 to 16,000. In one embodiment, the mixture of monomers includes styrenic monomers. Preferred styrenic monomers include, but are not limited to, d-alkylstyrenes, trans-β-alkylstyrenes, alkylstyrenes, alkoxystyrenes, halogenated styrenes, vinyl naphthalenes and mixtures thereof. Specific examples of styrenic derivatives include styrene, α-methylstyrene, trans-β-methylstyrene, 3-methylstyrene, 4-methylstyrene, 3-ethyl styrene, 3-isopropyl styrene, 3-butyl styrene, 3-cyclohexyl styrene, 3,4-dimethyl styrene. 3-chlorostyrene, 3,4-dichloro styrene, 3,4,5-trichloro styrene, 3-bromo styrene, 3-iodo styrene, 3-fluoro styrene, 3-chloro-4-methyl styrene, benzyl styrene, vinyl naphthalene, divinylbenzene, methyl vinylbenzoate ester, vinylbenzoic acid, vinyl phenol, 3-methoxy styrene, 3,4-dimethoxy styrene, 3-methyl-4-methoxy styrene, acetoxystyrene, acetoxymethylstyrene and (t-butoxycarbonyloxy) styrene. The styrenic monomers may be substituted with ionic functionalities such as sulfonate and carboxylate. Specific examples include sodium styrenesulfonate and sodium vinylbenzoate.

In another embodiment, the mixture of monomers includes acrylic monomers. The term "acrylic monomer" as employed herein includes acrylic acid, acrylate esters and derivatives and mixtures thereof. Examples of acrylic acid monomers include but are not limited to alkylacrylic acids, 3-alkylacrylic acids and 3-haloacrylic acids. Specific examples include crotonic acid, cinnamic acid, citraconic acid, sorbic acid, fumaric acid, methacrylic acid, ethacrylic acid, 3-methylacrylic acid, 3-chloroacrylic acid and 3-chloromethacrylic acid.

Examples of acrylate esters include but are not limited to alkyl acrylates, aryl acrylates, alkyloxyalkyl acrylates, alkyloxyaryl acrylates, hydroxyalkyl acrylates, hydroxyaryl acrylates, crotonic esters, cinnamic esters, citraconic esters, sorbic esters and fumaric esters. Specific examples include n-butyl acrylate, methyl acrylate, ethyl acrylate, n-propyl acrylate, isopropyl acrylate, amyl acrylate, hexyl acrylate, n-octyl acrylate, lauryl acrylate, 2-chloroethyl acrylate, phenyl acrylate, benzyl acrylate, allyl acrylate, methyl 3-chloroacrylate, 2-ethylhexyl acrylate, 2-methoxyethyl acrylate, 2-(2-methoxyethoxy)ethyl acrylate, 2-ethoxyethyl acrylate, 2-(2-ethoxyethoxyl)ethyl acrylate, 2-hydroxyethyl acrylate, 2-hydroxypropyl acrylate, glycidyl acrylate, N,N-dimethylaminoethyl acrylate, trifluoroethyl acrylate, 2-sulfoethyl acrylate and the corresponding methacrylates.

Acrylic monomers useful in the present invention also include unsaturated anhydride and unsaturated imide monomers which may be completely or partially hydrolyzed after polymerization to form the corresponding carboxylic acid or amide functionality. Specific examples include but are not limited to maleic anhydride, methylmaleic anhydride, glutaconic anhydride, itaconic anhydride, citraconic anhydride, mesaconic anhydride, maleimide and N-methylmaleimide. Also useful are mono-ester and bis-ester derivatives of the aforementioned.

Other monomers useful in the present invention include acrylamide and derivatives such as but not limited to N-alkyl acrylamides, N-aryl acrylamides and N-alkoxyalkyl acrylamides. Specific examples include N-methyl acrylamide, N-ethyl acrylamide, N-butyl acrylamide, N,N-dimethyl acrylamide, N,N-dipropyl acrylamide, N-(1,1,2-trimethylpropyl) acrylamide, N-(1,1,3,3-tetramethylbutyl) acrylamide, N-methoxymethyl acrylamide, N-methoxyethyl acrylamide, N-methoxypropyl acrylamide, N-butoxymethyl acrylamide, N-isopropyl acrylamide, N-s-butyl acrylamide, N-t-butyl acrylamide, N-cyclohexyl acrylamide, N-(1,1-dimethyl-3-oxobutyl)acrylamide N-(2-carboxyethyl)acrylamide, 3-acrylamido-3-methyl butanoic acid, methylene bisacrylamide, N-(3-aminopropyl)acrylamide hydrochloride, N-(3,3-dimethylaminopropyl)acrylamide hydrochloride, N-(1-phthatamidomethyl)acrylamide, sodium N-(1,1-dimethyl-2-sulfoethyl)acrylamide and the corresponding methacrylamides.

Besides being derived from styrenic and acrylic monomers, the addition polymers useful in the present invention may have functionality derived from a variety of other types of monomers well known in the art of polymer chemistry. Such monomers include vinyl derivatives and ethylenically unsaturated compounds in general. Examples of these other monomer types include but are not limited to olefins (e.g., dicyclopentadiene, ethylene, propylene, 1-butene, 5,5-dimethyl-1-octene, etc.); halogenated olefins (e.g., vinyl chloride, vinylidene chloride, etc.); α-alkylalkenes, acrylonitriles, acroleins, vinyl ethers, vinyl esters, vinyl ketones, vinylidene chloride compounds, allyl compounds, and ethylenically unsaturated heterocyclic compounds. Specific examples include allyl acetate, allyl caproate, methyl vinyl ether, butyl vinyl ether, methoxyethyl vinyl ether, ethoxyethyl vinyl ether, chloroethyl vinyl ether, 1-methyl-2,2-dimethylpropyl vinyl ether, hydroxyethyl vinyl ether, diethylene glycolvinyl ether, dimethylaminoethyl vinyl ether, butylaminoethyl vinyl ether, benzyl vinyl ether, tetrahydrofurfuryl vinyl ether, vinyl acetate, vinyl propionate, vinyl butyrate, vinyl isobutyrate, vinyl dimethyl propionate, vinyl ethyl butyrate, vinyl chloroacetate, vinyl dichloroacetate, vinyl methoxyacetate, vinyl phenyl acetate, vinyl acetoacetate, N-vinyl oxazolidone, N-vinylimidazole, N-vinylpyrrolidone, N-vinylcarbazole, vinyl thiophene and N-vinylethyl acetamide.

The addition polymers useful in the present invention may be derived from monomers capable of absorbing UV light after polymerization. Examples of such monomers are disclosed and claimed in U.S. Pat. No. 6,699,538. A variety of other types of monomers well known in the art of polymer chemistry can be used. Still other monomer types include multifunctional monomers having some combination of functionality described above.

Addition polymers useful in the present invention are commonly prepared by free radical polymerization of vinyl or ethylenically unsaturated monomers; however, other polymerization methods such as anionic polymerization, cationic polymerization, polyinsertion, and others well known in polymerization chemistry are also suitable. Synthetic techniques well known in the art of polymer chemistry include but are not limited to emulsion polymerization, solution polymerization, suspension polymerization and dispersion polymerization.

In one embodiment the acrylic polymer is a copolymer comprising benzyl methacrylate and methacrylic acid. In another embodiment, the addition polymer is a styrene-acrylic copolymer comprising a mixture of vinyl or unsaturated monomers, including at least one styrenic monomer and at least one acrylic monomer, at least one of which monomers has an acid or acid-providing group.

The following commercially available styrene-acrylic polymers may be employed in the composition of the invention, for example, styrene-acrylic polymer having acid number 240, sold as Joncryl® 70 from S.C. Johnson Co. (Wisconsin, USA); a styrene-acrylic polymer having acid number 230 sold as TruDot™ IJ-4655 from MeadWestvaco Corp. (Stanford, Conn., USA); a styrene-acrylic polymer having acid number 215 sold as Joncryl® 59 from S.C. Johnson Co.; a styrene-acrylic polymer having acid number 215 sold as Joncryl® 57 from S.C. Johnson Co.; a styrene-acrylic polymer having acid number 213 sold as Joncryl® 63 from S.C. Johnson Co.; a styrene-acrylic polymer having acid number 172 sold as TruDot™ IJ-4680 from MeadWestvaco Corp.; an acrylic resin having acid number 160 sold as Vancryl® 68S from Air Products and Chemicals, Inc. (Allentown, Pa.).

Prior to use, preferably the acid groups of the at least two different polymers are partially or completely neutralized. It is preferred that 50% or more of the acid groups of each polymer are neutralized. It is more preferred that 70% or more of the acid groups of each polymer are neutralized. The acid groups may be neutralized with any suitable base, examples of which include inorganic or organic bases such as alkali metal hydroxides, ammonia, mono-, di- and trialkyl- or aryl amines, nitrogen-containing heterocycles; and tetraalkyl- or aryl amines and the like. Specific examples of bases include sodium hydroxide, potassium hydroxide, lithium hydroxide, ammonia, triethylamine, triethanolamine, diethanolamine, 4-ethylmorpholine or dimethylethanolamine. The identity and amount of base used is dependent on the desirable viscosity, jettability through printhead type and print durability and other properties delivered by the ink composition of the present invention. In a preferred embodiment of the invention, an inorganic base such as sodium hydroxide or potassium hydroxide is used.

The polymers employed in the present invention may be either water-soluble, or water-dispersible. By the term "water-soluble" is meant herein that the polymer is dissolved in water such that scattering is not observed when a dilute solution of the polymer is analyzed using dynamic light scattering or any other technique well known in the art of particle analysis. By the term "water-dispersible" is meant herein that the polymer exists in the form of particles in water, the particles being dispersed or suspended and often stabilized against flocculation and settling by the use of dispersing agents. In contrast to a water-soluble polymer, a dilute solution of a water-dispersible polymer exhibits scattering when analyzed using dynamic light scattering or any other technique well known in the art of particle analysis.

The ratio of the first (preferably a condensation polymer) polymer to the second (preferably an addition polymer) polymer is preferably 1:2 to 4:1. Both may be present in any amount as long as they meet the weight average acid number requirement. Factors that must be considered include durability, resolution and drop size capacity of the printhead, print speed, application method (pre during or post colored inks) masking pattern, etc., as well as the properties of the ink and recording element used to form the printed image. In general, the first polymer is present in the composition in an amount of up to 20% by weight of the composition. The first polymer is preferably present in an amount of up to 10% by weight of the composition, and more preferably up to 5% by weight of the composition. In general, the second polymer is present in the composition in an amount of up to 20% by weight of the composition, preferably in an amount of up to 10% by weight of the composition, and more preferably up to 5% by weight of the composition. Generally both polymers are present in at least the amount 0.1% by weight.

The ink composition may also comprise only the polyurethane polymer that has an acid number of 60 to 100 and a molecular weight of greater than 10,000 or the acrylic polymer that has an acid number greater than 180 and a molecular weight of less than 18,000. These polymers may be those as described in detail above.

Particularly when used as a colorless coating in an overcoat format the polymers are present in the ink composition in an amount required to give a protective overcoat of desired water and stain resistance after the overcoat composition has been printed and dried. By the term "stain resistance" is meant herein that, after printing, the imaged recording element does not imbibe water or has a protective overcoat that prevents or minimizes water-based stains from discoloring the imaged side of the imaged-recording element. Furthermore, the overcoat thickness, or dry laydown of polymer, is not particularly limited, and is determined not only by the inherent capacity of that polymer to function as a protective overcoat, but also by numerous other factors as discussed above. The overcoat thickness is not particularly limited, but is preferably up to about 4 microns, and more preferably up to about 2 microns.

The colored ink or the anionic polymer ink can additionally comprise charge compatible charged protective filler particles activated on admixing the inks. Examples include: a first ink having an anionic polymer and anionic charged protective filler to be mixed with a second ink having a cationic charged pigment; a first ink having anionic polymer to be mixed with a second ink having a cationic charged pigment and a cationic charged protective filler particle; and a first ink having an anionic polymer and anionic charged protective filler to be mixed with a second ink having a cationic charged pigment and a cationic charged protective filler particle.

The exact choice of ink components will depend upon the specific application and performance requirements of the printhead from which they are jetted and the media type to be printed upon. Thermal and piezoelectric drop-on-demand printheads and continuous printheads each require ink compositions with a different set of physical properties in order to achieve reliable and accurate jetting of the ink, as is well known in the art of inkjet printing. Acceptable surface tensions are typically no greater than 60 dynes/cm, and preferably in the range of 20 dynes/cm to 45 dynes/cm.

When the composition is a substantially colorless composition it may be the same or different from the formulations of the colored inks that are used in that particular printhead or printing system. The ink compositions useful in the invention may include humectants and/or co-solvents in order to prevent the ink composition from drying out or crusting in the nozzles of the printhead, aid solubility of the components in the ink composition, or facilitate penetration of the ink composition into the recording element after printing.

Representative examples of humectants and co-solvents used in aqueous-based ink compositions include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofuryl alcohol; (2) polyhydric alcohols, such as ethylene glycol, diethylene glycol, triethylene glycol, tetraethylene glycol, propylene glycol, polyethylene glycol, glycerol, 2-methyl-2,4-pentanediol, 1,2,6-hexanetriol, 2-ethyl-2-hydroxymethyl-1,3-propanediol, 1,5 pentanediol, 1,2-hexanediol, and thioglycol; (3) lower mono- and di-alkyl ethers derived from the polyhydric alcohols; (4) nitrogen-containing compounds such as urea, 2-pyrrolidone, N-methyl-2-pyrrolidone, and 1,3-dimethyl-2-imidazolidinone; and (5) sulfur-containing compounds such as 2,2'-thiodiethanol. Typical aqueous-based ink compositions useful in the invention may contain, for example, the following components based on the total weight of the ink: water 20-95%, humectant(s) 5-70%, and co-solvent(s) 2-20%.

Other components present in the colorless ink compositions of the invention include surfactants, defoamers, biocides, buffering agents, conductivity enhancing agents, antikogation agents, drying agents, waterfast agents, chelating agents, light stabilizers, or ozone stabilizers. When the ink is a substantially colorless ink or overcoat composition it may be colored with very small amounts of colorants in order to impart a desired hue to any or all of the printed image, or in some cases, to correct the color balance of a printed image. Useful colorants include pigments, dyes, polymeric dyes, loaded-dye/atex particles, or combinations thereof, and many of these types of colorants are well known in the art of ink jet inks. In general, colorants may be used in an amount of up to about 0.2% by weight of the composition.

The ink jet ink composition is applied to a printed image using an ink jet printhead. Any type of printhead may be used including, but not limited to, drop-on-demand printheads which utilize piezoelectric transducers or thermal bubble formation, or continuous printheads which utilize electrostatic charging devices and deflector plates. The invention is particularly suitable for use with a thermal printhead. Examples of printheads useful in the invention include those used in Canon USA, Inc., Hewlett-Packard Co., and Epson America Inc. desktop and wide-format ink jet printers, and in printing systems described in U.S. 2004/0100542 A1; U.S. 2003/0117465 A1; U.S. 2003/0043223 A1; U.S. Pat. No. 6,079,821; U.S. Pat. No. 6,450,619 B1; U.S. Pat. No. 6,217,163 B1; U.S. 2004/0032473 A1, U.S. 2003/0189626 A1, or U.S. 2004/0017406 A1. The printhead used in the invention may be part of any type of conventional inkjet printing system that deposits one or more inks or fluids onto an recording element.

When the composition is a substantially colorless composition the printhead containing the substantially colorless composition may be positioned in any one of the printhead ports intended for use with printheads containing colored inks, or it may be positioned in a printhead port that is intended for use with a colorless ink as described in the above references. The printhead containing the substantially colorless composition may be positioned on the same carriage assembly as the one used for colored inks, or it may be on a separate carriage assembly.

The ink compositions of the invention can be applied to various recording elements well known in the art of ink jet printing including both porous and swellable types, and either may be used to generate the printed image. Representative examples of such recording elements are disclosed in U.S. Pat. Nos. 6,045,917; 5,605,750; 5,723,211; 5,789,070 and EP 813 978 A1. In a preferred embodiment of the invention, porous recording elements are employed because they dry quickly. In another preferred embodiment of the invention, porous recording elements having high gloss are employed because they render photographic quality printed images. In one preferred embodiment the ink jet receiver is plain paper.

When the ink composition is substantially colorless it is preferred that the ink be printed in a predetermined pattern or in image specific levels in various portions of the printed image rather than being applied as a uniform overcoating. This type of approach permits selective application of the substantially colorless ink to areas of the image where environmental protection or optical improvements are required and can decrease the total volume of liquid applied to the media resulting in higher image quality, reduced media cockle and lower media ink capacity media requirements. U.S. Pat. No. 5,515,479 teaches one such method for limiting the volume of colored ink used to print an image but it is obvious to one skilled in the art that similar approaches can be utilized for the application of substantially colorless materials.

This invention also comprises a method of printing an ink jet image comprising separately applying to an ink jet receiver a colored ink and a substantially colorless ink, wherein the colored ink comprises a cationic coloring agent and the colorless ink comprises an anionic polymer or oligomer, and wherein the inks are applied in substantially an overlaying manner. The inks are as described in detail above. In one embodiment the inks are applied simultaneously in substantially an overlaying manner. In another embodiment the first ink is applied and subsequently the second ink is applied in an overlaying manner; or the second ink is applied and subsequently the first ink is applied in an overlaying manner. By overlying manner, it is meant that the two inks are applied to the media at closely enough to be in reactive association thereby enabling electrostatic cross reaction between the distinctly charged particles in the two distinct inks. In a preferred embodiment each of the first and second ink would have a dedicated delivery channel to avoid having the oppositely charged materials in the two inks interact until they come in reactive association on the intended media. The colorless ink may be applied either in the same pass as the one that jets the colored inks, or in a different pass.

In a preferred embodiment the printer comprises a thermal printhead. In another preferred embodiment, the ink jet recording element is a plain paper.

The following example is provided to illustrate, but not to limit, the invention.

EXAMPLES

Polymer Characterization

Weight Average Molecular Weight $M_w$

Polymer samples were analyzed by size-exclusion chromatography using differential viscometry detection and a universal calibration curve as described in: T. H. Mourey and T. G. Bryan, *Journal of Chromatography A*, 964 (2002) 169-178. The eluent employed was 1,1,1,3,3,3-hexafluoroisopropanol containing 0.01 M tetraethylammonium nitrate. Columns used were two 7.5 mm×300 mm PLGel Mixed-C columns, available from Polymer Labs, and both columns were thermostated at 45° C. The absolute molecular weight distribution was calculated from viscosity data, and a universal calibration curve constructed from narrow-molecular weight poly(methylmethacrylate) standards between 620 (log M=2.79) and 1,450,000 (log M=6.16). Any portion of a polymer distribution appearing beyond the calibration range of the column set was not used for quantitative purposes. The ordinate "$W_n(\log M)$" was proportional to the weight fraction of the polymer at a given molecular weight on a logarithmic scale. Weight average molecular weight ($M_w$) and number average molecular weight ($M_n$) in HFIP at 45° C. are reported.

Calculated Acid Number, AN

Acid number is defined as the amount of KOH (in mg) required to neutralize 1 g of polymer. The acid number for each of the polymers was calculated using the amount of the monomer having a carboxylic acid group, the total amount of the monomers used in the synthesis of the polymer, and the molecular weight of the base used to neutralize the polymer according to the following equation:

$$AN = \left(\frac{amount\,of\ BHMPA(mol)}{total\,amount\,of\ monomers(g)}\right)\left(MW\ of\ base\left(\frac{g}{mol}\right)\right)(1000)$$

For example, referring to Polyurethane 1 of the Invention, PU-1, that is described below, the acid number was calculated as follows: the amount of the monomer having a carboxylic acid group was 0.432 mol, the total amount of the monomers used in the synthesis of the PU-1 was (136+57.9+107.8) g=301.7 g, and the molecular weight of KOH is 56 g/mol:

$$AN = \left(\frac{0.432\ \text{mol}}{301.7\ \text{g}}\right)\left(56\frac{g}{mol}\right)(1000) = 80$$

Weight average acid number of polymer mixture=(Wt % of a first polymer×AN of a first polymer)+(wt % of a second polymer×AN of a second polymer)+etc, wherein the sum of wt % of all polymers equals 100%.

Preparation of Polyurethanes

Polyurethane 1 useful in the Invention, PU-1

In a 1-liter round bottom flask equipped with thermometer, stirrer, water condenser and a vacuum outlet was placed 136 g (0.068 moles) of poly(hexamethylene carbonate) diol, avg. $M_n$=2000 (Aldrich 46, 116-4). It was dewatered under vacuum at 100° C. The vacuum was released and the following were added at 40° C. while stirring: 57.9 g (0.432 moles) 2,2-bis(hydroxymethyl) propionic acid (BHMPA), 160 g tetrahydrofuran (THF), and 1 mL of stannous octoate (catalyst). The temperature was adjusted to 68° C., and when a homogeneous solution was obtained, 107.8 g (0.485 moles) of isophorone diisocyanate (IPDI) was slowly added, followed by 10 mL THF. The temperature was raised to 72 C and maintained for about 16 hours to complete the reaction, resulting in an intermediate containing less than 3% of free IPDI. The free IPDI content was monitored by IR spectroscopy of the absorption peak at 2240 wave number.

The reaction mixture was diluted with 200 mL THF, and neutralized with 53.86 g of 45 wt. % KOH solution to achieve 100% stoichiometric ionization based on the amount of BHMPA. Under high shear, 900 mL of distilled water was added and THF was subsequently removed by heating under vacuum to give an aqueous solution of PU-1 at 27.51 wt. % solids. The molecular weights of PU-1 were $M_w$=18,800 and $M_n$=8440; and the AN=80.

Polyurethane 2 Useful in the Invention, PU-2

The procedure was repeated with the following modifications: 140 g (0.070 moles) of poly(hexamethylene carbonate) diol; 57.7 g (0.430 moles) BHMPA; 106.7 g (0.480 moles) IPDI; neutralized with 53.62 g of 45 wt. % KOH solution. The final solution was 32.34 wt. % solids. The molecular weights of PU-5 were $M_w$=12,800 and $M_n$=5620; and the AN=79.

Styrene-acrylic Polymer Useful in the Invention

TruDot™ IJ-4655, commercially available from Westvaco Corp., has an acid number of 230 quoted from Wastvaco. A 25% by weight of aqueous solution was prepared by mixing polymer resin, potassium hydroxide and water and stirred at 60 C for 8 hours. Potassium hydroxide was added at 95 mole % based on its acid number. The molecular weight of SA-1 was Mw=16700 and Mn=5670.

Acrylic Polymer Useful in the Invention 100 g of diethylene glycol (DEG) and 0.25 g of 2,2'-azobisisobutyronitrile (AIBN) were charged to a 1-liter, three-neck round-bottom flask equipped with a mechanical stirrer and nitrogen inlet. The resulting solution was purged with nitrogen for 20 minutes and heated to 150 degrees Centigrade in a constant temperature bath. In a separate container, 100 g of DEG, 0.25 g of AIBN, 33.5 g of benzyl methacrylate (BM), and 16.5 g of methacrylic acid (MA) were combined, mixed well, and then added to the first solution over 2 hours. Polymerization was continued for 3 hours. The temperature was reduced to 65-70 degrees Centigrade, and 1 mL each of t-butyl hydroperoxide (10 weight percent) and sodium formaldehyde bisulfite (10 weight percent) were then added. The resulting polymer was isolated and a 20 wt. % aqueous solution prepared by neutralizing the polymer to 65-70 wt. % with potassium hydroxide.

The resulting random copolymer of BM/MA in a 67/33-weight ratio was found to have a number average molecular weight of 4960 and a weight average molecular weight of 7580. The calculated acid number is 215.

Example 1

Preparation of Ink-jet Ink Samples 1 Through 5

Ink-jet Ink 1 (anionic polymer clear ink) was prepared by mixing 4.4% Trudot IJ4655 (a styrene—acrylic acid co-polymer) with 5% diethylene glycol, 2.5% glycerol, and 0.5% Surfynol-465 with the balance water at pH ~8.2.

Ink-jet Ink 2 (anionic polymer clear ink) was prepared by mixing 4.4% Trudot IJ4655 with 5% diethylene glycol, 2.5% glycerol, and 0.5% Strodex-PK90 with the balance water at pH 8.2.

Ink-jet Ink 3 (anionic polymer clear ink) was prepared by mixing Trudot 4.4% IJ4655 with 5% diethylene glycol, 2.5% glycerol, 2.5% diethylene glycol mono-butyl ether and 0.5% Surfynol-465 with the balance water at pH ~8.2.

Ink-jet Ink 4 (anionic self-dispersed colored pigment ink) was prepared by mixing about 4% of an anionic self-dispersed carbon black (from a 15% dispersion of carboxylate derivatized carbon black (PK7) prepared according to Johnson and Belmont, U.S. Pat. No. 5,922,118 an average particle size of about 130 nm), with 12% diethylene glycol, 0.5% Strodex PK-90 surfactant and 0.06% tri ethanol amine with the balance water at pH ~8.3.

Ink-jet Ink 5 (cationic self dispersed colored pigment ink) was prepared by mixing about 4% of a cationic self-dispersed carbon black (from a 10% dispersion of polyethyleneimine derivatized carbon black (PK7) prepared according to Palumbo and Lando in WO 01/51566 A1 at an average particle size of about 130 nm), with 12% diethylene glycol, 0.1% Strodex PK-90 surfactant with the balance water at pH ~5.

Example 2

Application and Evaluation of Images Formed by Inks 1 Through 5 on a Variety of Plain Papers Inks 1 to 5 (carbon black inks and clear polymeric inks) were applied singly and in combination using a thermal ink jet apparatus (Canon i960) to a variety of commercially available general purpose and ink-jet designed plain papers. Both the formed density and the uniformity of the formed density deposits were examined. The uniformity of the formed deposits can be influenced by the appearance of paper fibers that are not colored by the applied inks or ink combinations. The results are reported in Table 1, below. This table recites formed density on several plain papers, the average density across the paper set and the density coefficient of variation (COV) across the paper set as a function of the applied inks. Needless to say, high average density with low density COV is a desired outcome.

cyan pigment (from a micro-milled dispersion of Cetyl-trimethyl ammonium bromide [CTAB] dispersed cyan copper phthalocyanine pigment (See Wang et al EK Docket 88567 not yet filed) dispersed at ca 4:1 with 12% Polyethylene Glycol (Mn ~400), 3% 2-pyrrolidinone, 0.1% Surfynol-465 with the balance water.

TABLE I

|  | Multipurpose Office Paper 1 | Multipurpose Office Paper 2 | InkJet plain paper 1 | Multipurpose Office Paper 3 | InkJet plain paper 2 | | Average Density Across Media | Density COV across media |
|---|---|---|---|---|---|---|---|---|
|  | 0.07 | 0.08 | 0.06 | 0.06 | 0.05 | | 0.06 | 17.8 |
| Anionic polymer Ink 1 | 0.07 | 0.08 | 0.06 | 0.06 | 0.05 | | 0.06 | 17.8 |
| Anionic pigment Ink 4 | 1.25 | 1.16 | 1.30 | 1.08 | 1.31 | | 1.22 | 8.1 |
| Inks 1 and 4 | 0.92 | 0.92 | 0.94 | 0.87 | 1.03 | | 0.94 | 6.3 |
| Anionic polymer Ink 2 | 0.08 | 0.08 | 0.06 | 0.06 | 0.05 | | 0.07 | 20.3 |
| Anionic pigment Ink 4 | 1.27 | 1.19 | 1.29 | 1.10 | 1.42 | | 1.25 | 9.5 |
| Inks 2 and 4 | 0.92 | 0.97 | 0.97 | 0.87 | 1.10 | | 0.97 | 8.9 |
| Anionic polymer Ink 3 | 0.08 | 0.08 | 0.06 | 0.07 | 0.05 | | 0.07 | 19.2 |
| Anionic pigment Ink 4 | 1.24 | 1.15 | 1.24 | 1.04 | 1.40 | | 1.21 | 10.9 |
| Inks 3 and 4 | 0.86 | 0.94 | 0.95 | 0.86 | 1.06 | | 0.93 | 8.8 |
| Anionic polymer Ink 1 | 0.07 | 0.07 | 0.06 | 0.07 | 0.05 | | 0.06 | 14.0 |
| Cationic pigment Ink 5 | 1.08 | 1.08 | 1.07 | 1.15 | 1.11 | | 1.10 | 3.0 |
| Inks 1 and 5 | 1.40 | 1.36 | 1.45 | 1.40 | 1.43 | INV | 1.41 | 2.4 |
| Anionic polymer Ink 2 | 0.07 | 0.08 | 0.06 | 0.07 | 0.05 | | 0.07 | 17.3 |
| Cationic pigment Ink 5 | 1.08 | 1.11 | 1.11 | 1.15 | 1.10 | | 1.11 | 2.3 |
| Inks 2 and 5 | 1.46 | 1.46 | 1.49 | 1.47 | 1.48 | INV | 1.47 | 0.9 |
| Anionic polymer Ink 3 | 0.08 | 0.08 | 0.06 | 0.07 | 0.05 | | 0.07 | 19.2 |
| Cationic pigment Ink 5 | 1.09 | 1.08 | 1.09 | 1.16 | 1.08 | | 1.10 | 3.1 |
| Inks 3 and 5 | 1.49 | 1.45 | 1.51 | 1.46 | 1.51 | INV | 1.48 | 1.9 |

As is readily apparent, the presence of the cationic pigment in combination with an anionic polymeric material applied from distinct heads to the same area provides for the improved density across a wide variety of media and further provides the smallest variation in formed density between the various media, thus improving the consumer ink-jet experience. Notice further that the combination of an anionic pigment in combination with an anionic polymer degrades the density performance of the anionic pigment. So, the ability to employ the anionic polymer for its water-fastness and image stability roles is compromised except when employed in combination with a cationic pigment.

Example 3

Preparation of Ink-jet Ink Samples 6 Through 10

Ink-jet ink 6 (anionic self-dispersed colored pigment ink) was prepared by mixing about 4% of an anionic self-dispersed carbon black (from a 15% dispersion of carboxylate derivatized carbon black (PK7) prepared according to Johnson and Belmont, U.S. Pat. No. 5,922,118 an average particle size of about 130 nm), with 12% polyethylene glycol (Mw ~600 daltons), 3% 2-pyrrolidinone, 0.5% Surfynol-465 surfactant with the balance water at pH ~8.3.

Ink-jet ink 7 (anionic conventionally dispersed) was prepared by mixing about 4% of anionic surfactant stabilized carbon black (from a 12% dispersion of OMT [potassium N-methyl-N-oleoyl taurate] dispersed carbon black (PK7) micro-milled according to Bishop and Czekai, U.S. Pat. No. 5,679,138 to an average particle size of about 50 nm), with 12% Polyethylene Glycol (Mw ~300), 3% 2-pyrrolidinone, 0.1% Surfynol-465 with the balance water at pH ~8.3.

Ink-jet ink 8 (cationic conventionally dispersed) was prepared by mixing about 4% of a cationic surfactant stabilized Ink-jet ink 9 (cationic conventionally dispersed) was prepared by mixing about 4% of a cationic surfactant stabilized cyan pigment (from a micro-milled dispersion of Cetyl-trimethyl ammonium bromide [CTAB] dispersed cyan copper phthalocyanine pigment (See Wang et al EK Docket 88567 not yet filed) dispersed at ca 2:1 with 12% Polyethylene Glycol (Mn ~400), 3% 2-pyrrolidinone, 0.1% Surfynol-465 with the balance water.

Inkjet Ink 10 (cationic self dispersed) was prepared by mixing about 4% of a cationic self-dispersed carbon black (from a 10% dispersion of polyethyleneimine derivatized carbon black (PK7) prepared according to Palumbo and Lando in WO 01/51566 A1 at an average particle size of about 50 nm), with 12% Polyethylene Glycol (Mn ~400), 3% 2-pyrrolidinone, 0.1% Surfynol-465 surfactant with the balance water at pH 5.

Example 4

Application and Evaluation of Images Formed by Inks 6 Through 10 on a Variety of Plain Papers Inks 6 to 10 (text black inks and polymeric clear inks) were applied singly and in combination using a thermal ink jet apparatus (Canon i960) to a variety of commercially available general purpose and ink-jet designed plain papers. Both the formed density and the uniformity of the formed density deposits were examined. The uniformity of the formed deposits can be influenced by the appearance of paper fibers that are not colored by the applied inks or ink combinations. The results are reported in Table II, below. This table recites formed density on several plain papers, the average density across the paper set and the density coefficient of variation (COV) across the paper set as a function of the applied inks. Needless to say, high average density with low density COV is a desired outcome.

TABLE II

| | Multipurpose Office Paper 1 | Multipurpose Office Paper 3 | InkJet plain paper 1 | | Average Density Across Papers | Density COV across Papers |
|---|---|---|---|---|---|---|
| Dmin | 0.08 | 0.07 | 0.07 | | 0.07 | 9.5 |
| Anionic pigment Ink 6 | 1.33 | 1.32 | 1.34 | | 1.33 | 0.8 |
| Anionic polymer Ink 3 | 0.09 | 0.07 | 0.08 | | 0.08 | 10.2 |
| Inks 3 and 6 | 0.93 | 0.96 | 0.89 | | 0.92 | 4.1 |
| Anionic pigment Ink 7 | 1.09 | 1.09 | 1.08 | | 1.09 | 0.6 |
| Anionic polymer Ink 3 | 0.09 | 0.07 | 0.08 | | 0.08 | 10.2 |
| Inks 3 and 7 | 0.83 | 0.91 | 0.86 | | 0.86 | 4.5 |
| Cationic pigment Ink 8 | 1.11 | 1.07 | 1.03 | | 1.07 | 4.1 |
| Anionic polymer Ink 3 | 0.09 | 0.08 | 0.09 | | 0.09 | 8.0 |
| Inks 3 and 8 | 1.11 | 1.15 | 1.10 | INV | 1.12 | 2.5 |
| Cationic pigment Ink 9 | 0.90 | 0.82 | 0.79 | | 0.83 | 6.6 |
| Anionic polymer Ink 3 | 0.11 | 0.08 | 0.12 | | 0.10 | 16.2 |
| Inks 3 and 9 | 1.00 | 0.91 | 0.88 | INV | 0.93 | 6.8 |
| Cationic pigment Ink 10 | 1.13 | 1.01 | 1.11 | | 1.08 | 5.6 |
| Anionic polymer Ink 3 | 0.09 | 0.08 | 0.08 | | 0.08 | 6.9 |
| Inks 3 and 10 | 1.22 | 1.26 | 1.26 | INV | 1.24 | 2.0 |

As is readily apparent, the presence of the cationic pigment in combination with an anionic polymeric material applied from distinct heads to the same area provides for the improved density across a wide variety of media and further provides the smallest variation in formed density between the various media thus improving the consumer ink-jet experience. Notice further that the combination of an anionic pigment in combination with an anionic polymer degrades the density performance of the anionic pigment. So, the ability to employ the anionic polymer for its water-fastness and image stability roles is compromised except when employed in combination with a cationic pigment.

Example 5

Preparation of Ink-jet Ink Samples 11 Through 23

Inkjet ink 11 (anionic polymer clear ink) was prepared by mixing 0.8% Trudot IJ4655, 2.4% bezylmethacrylate—acrylic acid copolymer, with 12.5% diethylene glycol, 5% glycerol and 0.5% Strodex PK-90 with the balance water at pH ~8.2.

Ink-jet ink 12 (cationic conventionally dispersed) was prepared by mixing about 2.5% of a cationic surfactant stabilized cyan pigment (from a micro-milled dispersion of Cetyl-trimethyl ammonium bromide [CTAB] dispersed cyan copper phthalocyanine pigment, with 15% Polyethylene Glycol (Mn ~300), 6% 2-pyrrolidinone, 0.2% Surfynol-465 with the balance water.

Ink-jet ink 13 (cationic conventionally dispersed) was prepared by mixing about 3% of a cationic surfactant stabilized magenta pigment (from a micro-milled dispersion of Cetyl-trimethyl ammonium bromide [CTAB] dispersed magenta pigment PR122, with 15% Polyethylene Glycol (Mn ~300), 6% 2-pyrrolidinone, 0.2% Surfynol-465 with the balance water.

Ink-jet ink 14 (cationic conventionally dispersed) was prepared by mixing about 3.2% of a cationic surfactant stabilized yellow pigment (from a micro-milled dispersion of Cetyl-trimethyl ammonium bromide [CTAB] dispersed yellow pigment PY74, with 15% Polyethylene Glycol (Mn ~300), 6% 2-pyrrolidinone, 0.2% Surfynol-465 with the balance water.

Ink-jet ink 15 (cationic conventionally dispersed) was prepared by mixing about 3.2% of a cationic surfactant stabilized yellow pigment (from a micro-milled dispersion of Cetyl-trimethyl ammonium bromide [CTAB] dispersed yellow pigment PY155, with 15% Polyethylene Glycol (Mn ~300), 6% 2-pyrrolidinone, 0.2% Surfynol-465 with the balance water.

Ink-jet ink 16 (cationic conventionally dispersed) was prepared by mixing about 2.2% of a cationic surfactant stabilized cyan pigment (from a micro-milled dispersion of Cetyl-trimethyl ammonium bromide [CTAB] dispersed cyan copper phthalocyanine pigment with 15% Polyethylene Glycol (Mn ~300), 6% 2-pyrrolidinone, 0.2% Surfynol-465 with the balance water.

Ink-jet Ink 17 (anionic conventionally dispersed) was prepared by mixing about 2.5% of anionic surfactant stabilized cyan pigment (from a ca. 10% dispersion of OMT [potassium N-methyl-N-oleoyl taurate] dispersed cyan pigment PB15:3 micro-milled according to Bishop and Czekai, U.S. Pat. No. 5,679,138, with 15% Polyethylene Glycol (Mn ~300), 6% 2-pyrrolidinone, 0.2% Surfynol-465 with the balance water at pH ~8.3.

Ink-jet ink 18 (cationic polymeric dispersed) was prepared by mixing about 2.2% of an cationic polymer stabilized carbon black (from a 9% dispersion of carbon black (PK7) micro milled to average particle size of about 50 nm, in the presence of a N,N,N-trimethylethanolammonium methyacrylate-benzyl methacrylate copolymer, with 15% Polyethylene Glycol (Mn ~400), 9% 2-pyrrolidinone, 0.2% Surfynol-465 with the balance water at pH ~5.

Ink-jet ink 19 (anionic self dispersed) was prepared by mixing about 4% of an anionic self-dispersed carbon black (from a 15% dispersion of carboxylate derivatized carbon black (PK7) prepared according to Johnson and Belmont, U.S. Pat. No. 5,922,118 an average particle size of about 130 nm), with 25% diethylene glycol, 0.1% Surfynol-465 surfactant and 0.1% triethanol amine with the balance water at pH ~8.3.

Ink-jet Ink 20 (anionic conventionally dispersed) was prepared by mixing about 2.2% of anionic surfactant stabilized carbon black (from a 12% dispersion of OMT [potassium N-methyl-N-oleoyl taurate] dispersed carbon black (PK7) micro-milled according to Bishop and Czekai, U.S. Pat. No. 5,679,138 to an average particle size of about 50 nm), with 25% diethylene glycol, 1% IJ4655 (Trudot), 0.5% Surfynol-465 surfactant and 0.5% triethanol amine with the balance water at pH ~8.3.

Ink-jet Ink 21 (anionic conventionally dispersed) was prepared by mixing about 2.5% of anionic surfactant stabilized magenta pigment (from a ca. 10% dispersion of OMT [potassium N-methyl-N-oleoyl taurate] dispersed cyan pigment PB 15:3 micro-milled according to Bishop and Czekai, U.S. Pat. No. 5,679,138, with 6.8% diethylene glycol, 3% glycerol, 2.5% diethylene glycol mono-butyl ether, 1.7% Trudot and 0.1% Surfynol-465 with the balance water at pH ~8.3.

Ink-jet Ink 22 (anionic conventionally dispersed) was prepared by mixing about 3% of anionic surfactant stabilized magenta pigment (from a ca. 10% dispersion of OMT [potassium N-methyl-N-oleoyl taurate] dispersed magenta pigment PR122 micro-milled according to Bishop and Czekai, U.S. Pat. No. 5,679,138, with 18% diethylene glycol, 5% glycerol, 1.2% Trudot and 0.5% Surfynol-465 with the balance water at pH ~8.3.

Ink-jet Ink 23 (anionic conventionally dispersed) was prepared by mixing about 3.2% of anionic surfactant stabilized yellow pigment (from a ca 10% dispersion of OMT [potassium N-methyl-N-oleoyl taurate] dispersed yellow pigment PY155 micro-milled according to Bishop and Czekai, U.S. Pat. No. 5,679,138, with 5% diethylene glycol, 10% glycerol, 1.6% Trudot and 0.5% Surfynol-465 with the balance water at pH ~8.3.

Example 6

Application and Evaluation of Images Formed by Inks 6 Through 10 on a Variety of Plain Papers Inks 11 to 23 (colored pigment inks and polymeric clear inks) were applied singly and in combination using a thermal ink jet apparatus (Canon i960) to a variety of commercially available general purpose and ink-jet designed plain papers. Both the formed density and the uniformity of the formed density deposits were examined. Densities were read as Status A on peak densities under D55 illumination. The uniformity of the formed deposits can be influenced by the appearance of paper fibers that are not colored by the applied inks or ink combinations. The results are reported in Table III, below. This table recites formed density on several plain papers, the average density across the paper set and the density coefficient of variation (COV) across the paper set as a function of the applied inks. Needless to say, high average density with low density COV is a desired outcome.

As is readily apparent, the presence of the cationic pigment in combination with an anionic polymeric material applied from distinct heads to the same area provides for the improved density across a wide variety of media and further provides the smallest variation in formed density between the various media thus improving the consumer inkjet experience. Notice further that the combination of an anionic pigment in combination with an anionic polymer degrades the density performance of the anionic pigment. So, the ability to employ the anionic polymer for its water-fastness and image stability roles is compromised except when employed in combination with a cationic pigment.

Example 7

Layout for Printing of Color and Gray Scale Images on a Variety of Media

In an ink-jet printer system accommodating six delivery systems, the individual delivery systems are each charged with Inks employing either anionic or cationic materials according to the following scheme:

Text-Black delivery system (Kt)—cationic black colorant having optional cationic filler Photo-Black delivery system (Kp)—anionic black colorant having optional anionic filler particles Cyan delivery system (C)—anionic cyan colorant having optional anionic filler particles Magenta delivery system (M)—anionic magenta colorant having optional anionic filler particles Yellow delivery system (Y)—anionic yellow colorant having optional anionic filler particles Protective component delivery system (P)—anionic polymeric protective binder The printer head driver will deliver distinct combinations of these inks depending both on the color appropriate for the desired image or text and on user input as to plain paper v photo-paper choice.

Black on plain paper—system delivers Kt & P
Black on photo paper—system delivers Kp & P

TABLE III

|  | Multipurpose Office Paper 1 | Multipurpose Office Paper 3 | InkJet plain paper 1 | | Average Density Across Papers | Density COV across Papers |
|---|---|---|---|---|---|---|
| Anionic polymer Ink 11 | 0.12 | 0.11 | 0.10 | | 0.11 | 8.4 |
| Paper Dmin | 0.12 | 0.11 | 0.09 | | 0.11 | 14.7 |
| Cationic Pigment Ink 12 | 0.94 | 0.92 | 0.85 | | 0.90 | 4.8 |
| Both Inks 11 and 12 | 1.09 | 1.06 | 1.03 | INV | 1.06 | 2.8 |
| Cationic Pigment Ink 14 | 0.93 | 0.95 | 0.86 | | 0.91 | 5.2 |
| Both Inks 11 and 14 | 1.06 | 1.05 | 1.02 | INV | 1.04 | 2.2 |
| Cationic Pigment Ink 15 | 0.86 | 0.86 | 0.79 | | 0.84 | 5.1 |
| Both Inks 11 and 15 | 1.01 | 1.01 | 1.04 | INV | 1.02 | 1.7 |
| Cationic Pigment Ink 16 | 1.21 | 1.12 | 0.97 | | 1.10 | 11.2 |
| Both Inks 11 and 15 | 1.33 | 1.31 | 1.27 | INV | 1.30 | 2.3 |
| Anionic Pigment Ink 17 | 0.96 | 0.94 | 0.85 | | 0.92 | 6.3 |
| Both Inks 11 and 17 | 0.78 | 0.82 | 0.76 | | 0.79 | 4.1 |
| Anionic Pigment Ink 19 | 1.31 | 1.48 | 1.44 | | 1.41 | 6.4 |
| Both Inks 11 and 19 | 0.91 | 0.92 | 0.96 | | 0.93 | 2.9 |
| Anionic Pigment Ink 20 | 0.82 | 0.86 | 0.80 | | 0.82 | 3.9 |
| Both Inks 11 and 20 | 0.74 | 0.80 | 0.71 | | 0.75 | 5.8 |
| Anionic Pigment Ink 21 | 0.83 | 0.88 | 0.86 | | 0.86 | 2.8 |
| Both Inks 11 and 21 | 0.82 | 0.85 | 0.78 | | 0.82 | 4.2 |
| Anionic Pigment Ink 22 | 0.80 | 0.82 | 0.80 | | 0.80 | 1.5 |
| Both Inks 11 and 22 | 0.71 | 0.75 | 0.71 | | 0.72 | 3.1 |
| Anionic Pigment Ink 23 | 0.81 | 0.81 | 0.77 | | 0.80 | 2.6 |
| Both Inks 11 and 23 | 0.76 | 0.76 | 0.71 | | 0.75 | 3.8 |

Cyan, Magenta or Yellow on plain or photo paper—system delivers C, M, or Y & P

Process Black on plain paper—system delivers C, M, Y, Kt & P

Process Black on photo paper—system delivers C, M, Y, Kp & P

Example 8

Layout for Printing of Color and Gray Scale Images on a Variety of Media

In an ink-jet printer system accommodating five delivery systems, the individual delivery systems are each charged with Inks employing either anionic or cationic materials according to the following scheme:

Text-Black delivery system (Kt)—cationic black colorant

Cyan delivery system (C)—cationic cyan colorant having optional cationic filler particles Magenta delivery system (M)—cationic magenta colorant having optional cationic filler particles Yellow delivery system (Y)—cationic yellow colorant having optional cationic filler particles Protective component delivery system (Pa)—anionic polymeric protective binder having optional anionic filler particles The printer head driver will deliver distinct combinations of these inks depending both on the color appropriate for the desired image or text Cyan, Magenta, Yellow or Black—system delivers C, M, Y and/or Kt & Pa Example 9

Layout for Printing of Color and Gray Scale Images on a Variety of Media

In an ink-jet printer system accommodating nine delivery systems, the individual delivery systems are each charged with Inks employing either anionic or cationic materials according to the following scheme:

Text-Black delivery system (Kt)—cationic black colorant having optional cationic filler Photo-Black delivery system (Kp)—anionic black colorant having optional anionic filler particles Photo-Cyan delivery system (C)— anionic cyan colorant having optional anionic filler particles Photo-Magenta delivery system (M)—anionic magenta colorant having optional anionic filler particles Photo-Yellow delivery system (Y)—anionic yellow colorant having optional anionic filler particles Protective component delivery system (P)—anionic polymeric protective binder having optional anionic filler particles Text Cyan delivery system (tC)—cationic cyan colorant having optional cationic filler particles Text-Magenta delivery system (tM)—cationic magenta colorant having optional cationic filler particles Text-Yellow delivery system (tY)—cationic yellow colorant having optional cationic filler particles The printer head driver will deliver distinct combinations of these inks depending both on the color appropriate for the desired image or text and on user or machine sensor input as to plain paper v photo-paper choice.

Cyan, Magenta, Yellow or Black on plain paper—system delivers Kt, tC, tM and/or tY & P Cyan, Magenta, Yellow or Black on photo paper—system delivers Kp, C, M and/or Y & P The invention has been described in detail with particular reference to certain preferred embodiments thereof, but it will be understood that variations and modifications can be effected within the spirit and scope of the invention.

The invention claimed is:

1. A method of printing an ink jet image comprising separately applying to an ink jet receiver a colored ink and a substantially colorless ink, wherein the colored ink comprises a cationic coloring agent prepared from a colorant dispersed with a cationic oligomer, polymer or surfactant, and the colorless ink comprises an anionic polymer, and wherein the inks are applied in an overlaying manner.

2. The method of claim 1 wherein the two inks are applied in a simultaneous manner.

3. The method of claim 1 wherein the colored ink is applied and subsequently the colorless ink is applied in an overlaying manner.

4. The method of claim 1 wherein the ink jet receiver is plain paper.

5. The method of claim 1 wherein the coloring agent of the colored ink is a pigment.

6. The method of claim 1 wherein the coloring agent is black.

7. The method of claim 1 wherein coloring agent is cyan.

8. The method of claim 1 wherein the coloring agent is magenta.

9. The method of claim 1 wherein the coloring agent is yellow.

10. The method of claim 1 wherein the coloring agent is carbon black.

11. The method of claim 1 wherein the anionic polymer or oligomer in the colorless ink has a weight average molecular weight of 600 to 30,000.

12. The method of claim 1 wherein the e anionic polymer or oligomer in the colorless ink has an acid number of 50 to 200.

13. The method of claim 1 wherein the anionic polymer is polyester, polyurethane or polymers derived from styrene and/or acrylic acid derivatives.

14. The method of claim 1 wherein the colorless ink comprises at least two anionic polymers.

15. The method of claim 1 wherein the colorless ink comprises at least two different polymers, a first polymer and a second polymer, having a weight average acid number of 70 to 200.

16. The method of claim 15 wherein first polymer has an acid number of 60 to 100 and the second polymer has an acid number of 180 to 240.

17. The method of claim 15 wherein the first polymer is a polyurethane polymer that has an acid number of 60 to 100 and a molecular weight of greater than 10,000, and the second polymer is an acrylic polymer that has an acid number greater than 180 and a molecular weight of less than 18,000.

* * * * *